US012621725B2

(12) United States Patent
Ökvist et al.

(10) Patent No.: US 12,621,725 B2
(45) Date of Patent: May 5, 2026

(54) COORDINATED HANDOVER

(71) Applicant: Telefonaktiebolaget LM Ericsson (publ), Stockholm (SE)

(72) Inventors: Peter Ökvist, Luleå (SE); Tommy Arngren, Södra Sunderbyn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 415 days.

(21) Appl. No.: 18/029,361

(22) PCT Filed: Oct. 1, 2020

(86) PCT No.: PCT/EP2020/077476
§ 371 (c)(1),
(2) Date: Mar. 29, 2023

(87) PCT Pub. No.: WO2022/069045
PCT Pub. Date: Apr. 7, 2022

(65) Prior Publication Data
US 2023/0362747 A1     Nov. 9, 2023

(51) Int. Cl.
*H04W 36/00*          (2009.01)

(52) U.S. Cl.
CPC ...  *H04W 36/0061* (2013.01); *H04W 36/0085* (2018.08); *H04W 36/033* (2023.05)

(58) Field of Classification Search
CPC .................................................... H04W 36/00
See application file for complete search history.

(56) References Cited

U.S. PATENT DOCUMENTS

| | | |
|---|---|---|
| 2016/0198518 A1 | 7/2016 | Baek et al. |
| 2018/0014238 A1 | 1/2018 | Lee et al. |
| 2018/0092018 A1 | 3/2018 | Jung et al. |
| 2018/0184304 A1 | 6/2018 | Frenger et al. |
| 2018/0227821 A1 | 8/2018 | Tsai et al. |
| 2022/0030483 A1* | 1/2022 | Cheng ............. H04W 36/00838 |
| 2022/0046486 A1* | 2/2022 | Shrestha ........... H04W 36/0009 |

FOREIGN PATENT DOCUMENTS

WO        2017/119919 A1       7/2017

OTHER PUBLICATIONS

International Search Report and Written Opinion issued in International Application No. PCT/EP2020/077476 dated Jun. 15, 2021 (23 pages).
Chang, et. al., "Group-Based Sidelink Communication for Seamless Vehicular Handover," IEEE Access vol. 7, May 10, 2019 (12 pages).

* cited by examiner

*Primary Examiner* — Michael T Vu
(74) *Attorney, Agent, or Firm* — Rothwell, Figg, Ernst & Manbeck, P.C.

(57) ABSTRACT
A method for coordinated handover in a system comprising a first UE (101) communicating with a second UE (102) using a sidelink channel, wherein both the first UE and the second UE are being served by a source cell (104). The method includes the first UE detecting (s402) a handover event indicating that the first UE should trigger the source cell to initiate a handover of the first UE from the source cell to a neighbor cell. The method further includes, as a result of the first UE detecting the handover event, the first UE transmitting (s404) to the second UE a handover event message indicating that the first UE has detected the handover event.

13 Claims, 7 Drawing Sheets

400 s402
the first UE detecting a handover event indicating that the first UE should trigger the source cell to initiate a handover of the first UE from the source cell to a neighbor cell s404
the first UE transmitting to the second UE a handover event message indicating that the first UE has detected the handover event s406
The first UE transmitting a measurement report to the source cell s408
The UE receiving a configuration message from the source cell

310

104

301

399

388

102

302

Bix-1

Bix-2

Geofencing
controller

312

101

FPG may be moviing
towards eNB 304

304

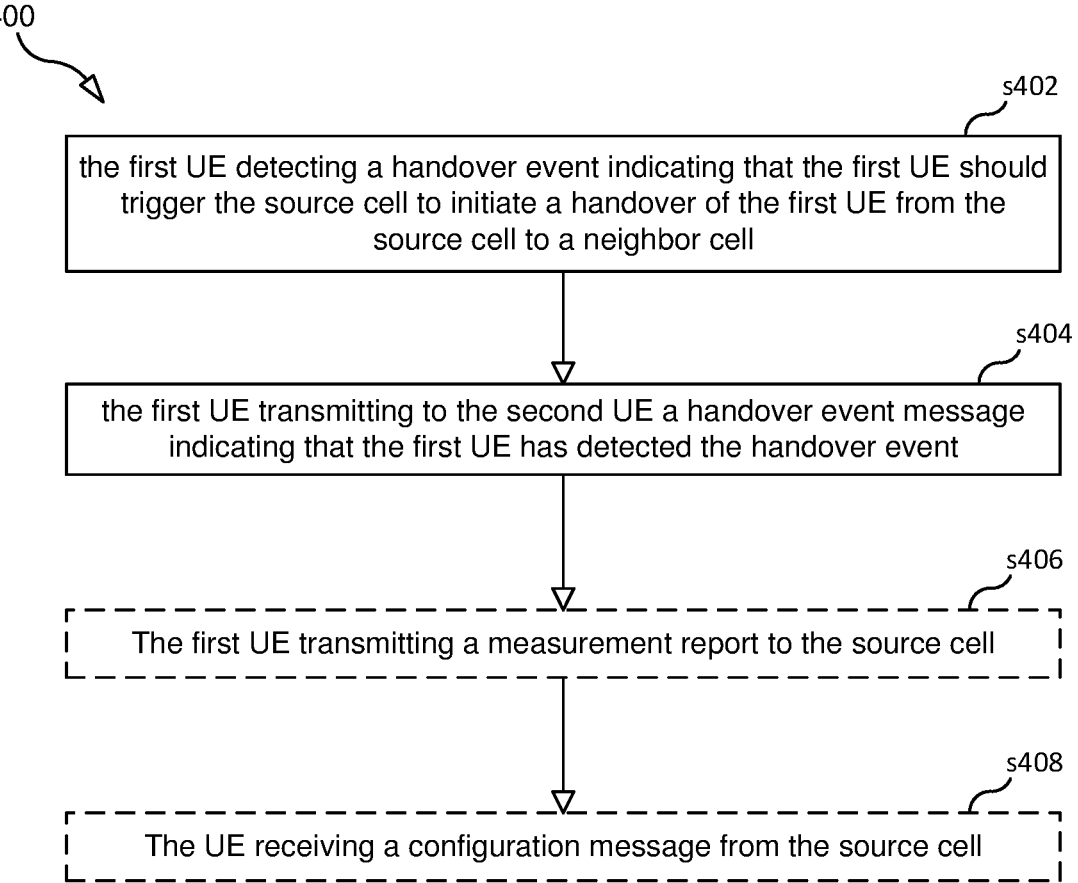

400 s402 the first UE detecting a handover event indicating that the first UE should trigger the source cell to initiate a handover of the first UE from the source cell to a neighbor cell s404 the first UE transmitting to the second UE a handover event message indicating that the first UE has detected the handover event s406

The first UE transmitting a measurement report to the source cell s408

The UE receiving a configuration message from the source cell

FIG. 4

500 s502 the second UE receiving a handover event message transmitted by the
first UE as a result of the first UE detecting a handover event s504 the second UE triggering the source cell to initiate a handover of the
second UE from the source cell to a neighbor cell

COORDINATED HANDOVER

CROSS REFERENCE TO RELATED APPLICATIONS

This application is a 35 U.S.C. § 371 National Stage of International Patent Application No. PCT/EP2020/077476, filed 2020 Oct. 1.

TECHNICAL FIELD

Disclosed are embodiments related to coordinated handover in a system comprising a first user equipment (UE) communicating with a second UE using a sidelink channel.

BACKGROUND

There are situations in which a first UE communicates with a second UE using a device-to-device (D2D) sidelink (SL) channel. As one example, the two UEs may be part of a group of UEs, where each UE is functioning as fence pole device (FPD) in a geo-fencing system, thereby forming a fence pole group (FPG). The relative motion among the UEs in the FPG may be static, but the FPG as whole may move in some direction, for example, as being moved in context of being packets/pallets/wagons carried by a transport truck, train, ship, or other (e.g. container carrying vehicle or vessel). As some point, the FPG may approach the boarder of the cell that is currently serving the FPG. Accordingly, the signal strength from the serving cell may decrease while at the same time the signal strength of a neighboring cell increases. When this situation occurs, a legacy procedure for handover may be triggered.

SUMMARY

Certain challenges presently exist. For instance, if the first UE and the second UE are far enough apart, then it is possible that the handover procedure is first triggered for the first UE, and then, at a later time, it is triggered for the second UE. The result of this is that the sidelink channel may be lost between the time when the first UE is handed over to the neighbor cell and the time when the second UE is handed over to the neighbor cell because the SL resources are assigned to the UEs by their respective serving cell. With a scenario of an elongated transport object, such loss of the SL channel between the first and second UEs may extend over quite some time. This could cause problems for an application (e.g., a geo-fencing application) running on the UEs that rely on the SL channel.

Accordingly, this disclosure in one aspect provides a method for coordinated handover in a system comprising a first UE communicating with a second UE using a sidelink channel, wherein both the first UE and the second UE are being served by a source cell. In one embodiments, the method includes the first UE detecting a handover event indicating that the first UE should trigger the source cell to initiate a handover of the first UE from the source cell to a neighbor cell. The method also includes, as a result of the first UE detecting the handover event, the first UE transmitting to the second UE a handover event message indicating that the first UE has detected the handover event. In one embodiment, the handover event message triggers the second UE to trigger the source cell to initiate a handover of the second UE from the source cell to the neighbor cell.

In another embodiment, the method includes the second UE receiving a handover event message transmitted by the first UE as a result of the first UE detecting a handover event. The method further includes, after receiving the handover event message, the second UE triggering the source cell to initiate a handover of the second UE from the source cell to a neighbor cell.

In another aspect there is provided a computer program comprising instructions which when executed by processing circuitry causes the processing circuitry to perform any of the methods disclosed herein. In another aspect there is provided a carrier containing the computer program, wherein the carrier is one of an electronic signal, an optical signal, a radio signal, and a computer readable storage medium.

A significant advantage of the embodiments disclosed herein is that the embodiments reduce the time between when the first UE is handed over to the neighbor cell and when the second UE is handed over to the neighbor cell. More generally, the embodiments enable all UEs within a particular group (e.g., a FPG) to be handed over to the neighboring cell at essentially the same time. Thus, to the extent the SL channel is lost during the handover from the source cell to the neighbor cell, a new SL channel can be rapidly established. Another advantage is that the process is transparent to the network (e.g., the base station serving the source cell).

BRIEF DESCRIPTION OF THE DRAWINGS

The accompanying drawings, which are incorporated herein and form part of the specification, illustrate various embodiments.

FIG. 4 is a flowchart illustrating a process according to some embodiments.

DETAILED DESCRIPTION

1. Introduction—D2D Communications

Device-to-device (D2D) communication applications range from public safety, traffic control/safety and commercial services like proximity based social networking, gaming, and advertisements for by-passers. Proximity based services can be provided when UEs are close to each other, and these services comprise ProSe Direct Discovery (identifies that two UEs are in proximity of each other; for two UEs in cellular coverage it may also be used for other commercial purposes), and ProSe Direct Communication between two UEs (resources from cellular traffic are reserved and used for this type of communication or enables communication in areas without cellular coverage).

In this context, sidelink (SL) is used for ProSe Direct Discovery and Prose Direct communication between UEs and the SL corresponds to the communication between two ProSe enabled UEs. SL communication describes the channel structure consisting of logical, transport, and physical channels over the air interface to realize a ProSe application.

Figure 1:
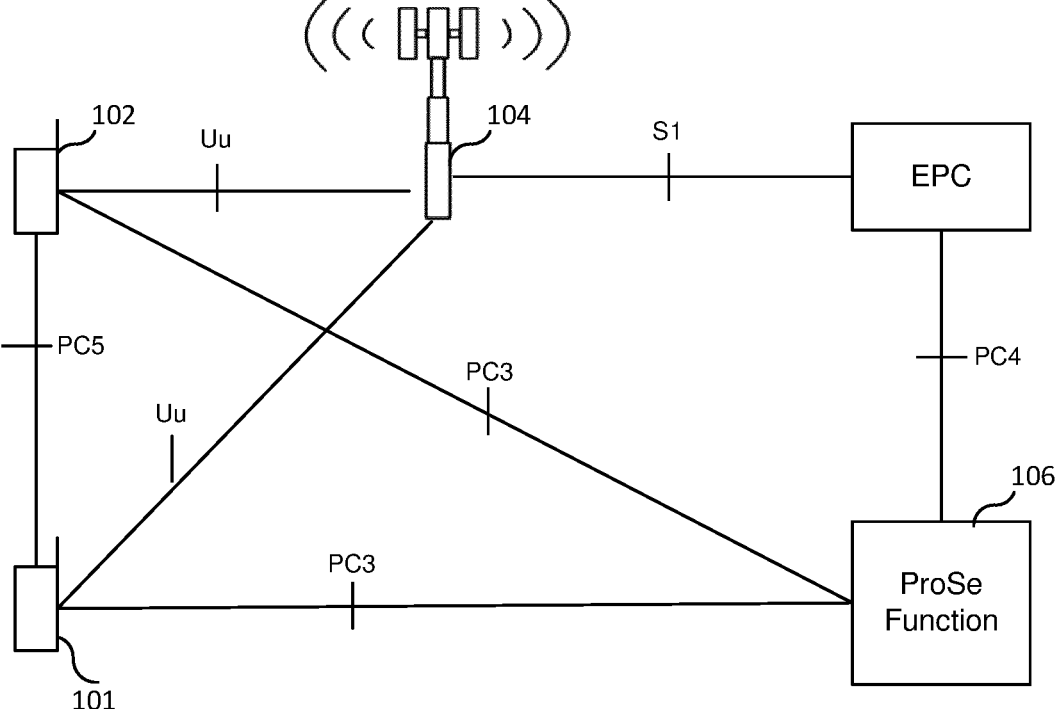
FIG. 1 illustrates a simplified architecture for ProSe.

FIG. 1 illustrates a simplified architecture for ProSe, including an SL interface (i.e., PC5) between UE 101 and UE 102. As shown in FIG. 1 several interfaces are associated with D2D communications; from a UE perspective, the most important ones are the PC5 interface between two UEs and the PC3 interface to a new defined node, the ProSe Function. For Release 12, the PC5 is a one-to-many communication interface. From a higher layer perspective, this is reflected in the assignment of destination IDs, which are always group IDs (to achieve some sort of unicast a group can have just one member). Using the PC3 interface, a UE (e.g., UE 101) contacts a ProSe Function 106. Typically, the IP address of the ProSe Function 106 might be preconfigured (hard-coded) in the UE 101. The alternative is that the UE 101 identifies the IP address of the ProSe Function 106 via DNS look-up. To contact the ProSe Function 106 the UE 101 has to establish an RRC connection with the network (e.g., base station 104).

Figure 2:
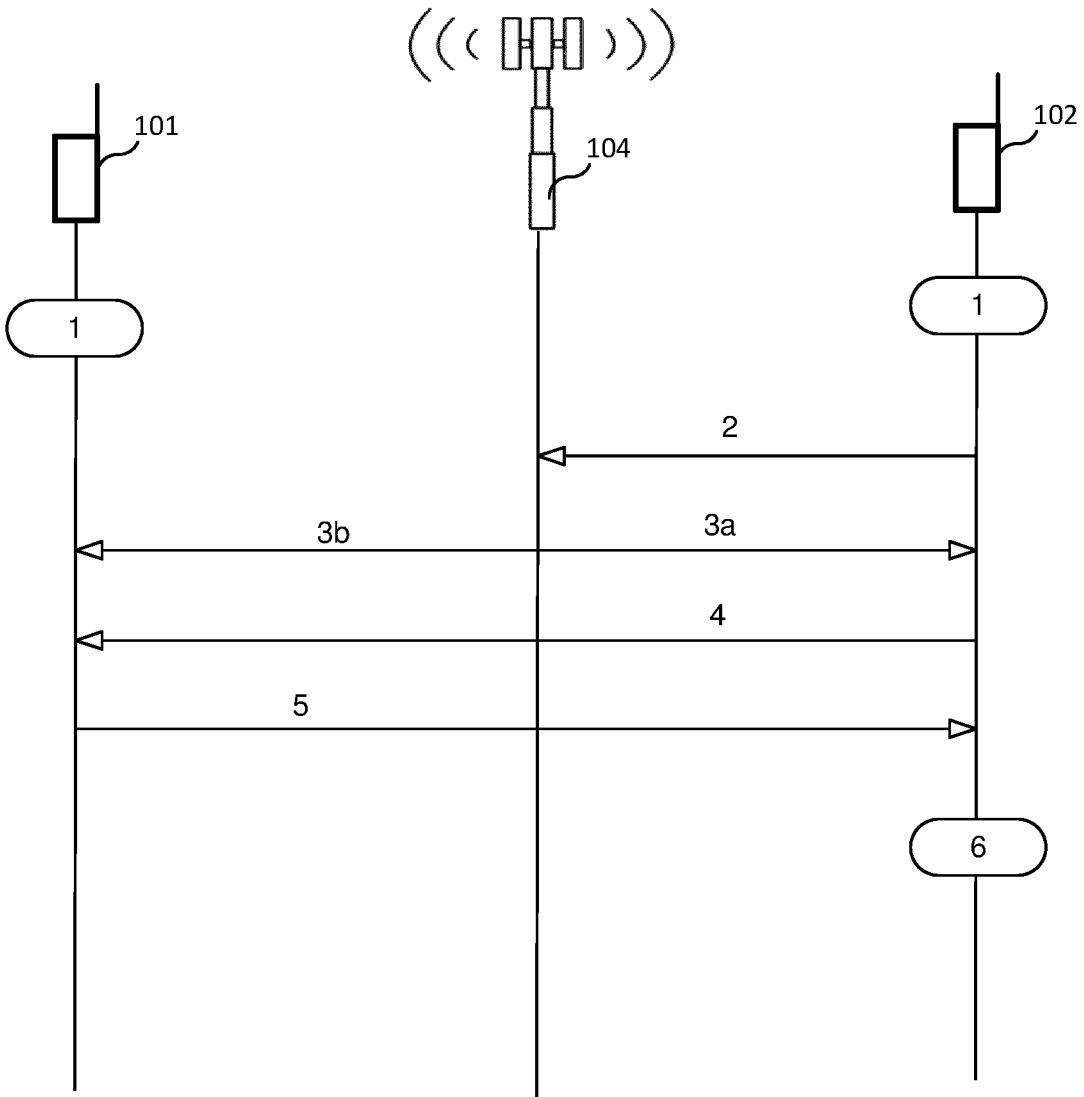
FIG. 2 illustrates an example message flow.

FIG. 2 illustrates a scenario where UE 102 desires to communicate with UE 101 in the coverage area of a cell served by base station 104 (e.g., an LTE base station (eNB)). A D2D SL transmission over PC5 interface typically involves the following steps.

Step 1: UE 101 and UE 102 enter the eNB 104 coverage area (or are powered on) and are informed of eNB D2D capabilities via the System Information Block (SIB) 18 (see, e.g., 3GPP TS 36.331). Step 2: UE 102 requests the eNB 104 to provide to UE 102 permission to use resources for SL transmission over PC5. Step 3a: eNB 104 acknowledges use of announcement over SL/PC targeting monitoring UE 101 using by eNB selected resources. Step 3b: eNB 104 then instructs UE 101 not to use certain uplink resources for the UE's "own transmissions" because potential imminent incoming transmissions over SL/PC5 (allocated on UL resources) may be expected from a near announcing UE 102. Step 4: UE 102 requests UE 101 to provide certain information. Step 5: UE 101 provides UE 102 with the requested information. Step 6: Requested data from UE 101 is made use of for related actions by UE 102, or passed through and used in upper layers of UE 102.

2. Example Use Case—Geofencing

Figure 3:
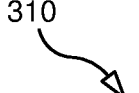
FIG. 3 illustrates a geofencing system according to an embodiment.

FIG. 3 illustrates an example of a Geofencing system 310 that uses SL communications among a group of UEs. In this use case, the geofencing system 310 comprises a group of four UEs—i.e., UE 101, UE 102, UE 301, and UE 302, which are initially placed at intended fence-pole positions. This group of UEs is referred to as a fence-pole group (FPG). Each UE (a.k.a., fence-pole-device (FPD)) has a respective geofencing application (GFA) that is invoked so that the FPD can identify the other FPDs in the FPG. Establishment of the intended FPG may be pre-initiated, distributing relevant defining credentials among the FPDs of the group. Geofencing system 310 also includes a geofenc-ing controller 312. While geofencing controller 312 is shown as being separate from the FPDs, this is not a requirement. In some embodiments, geofencing controller 312 is a component of one or more of the FPDs.

In one approach, a first FPD within the group (e.g., UE 101) initiates the use of D2D SL to issue a first D2D SL connection establishment request via an announcement among either the UEs being identified via the GFA or implicitly as a result of whatever UEs that respond to the UE 101's request.

In the step of establishing a D2D SL, beam connectivity to other UEs in the FPG is performed with the purpose of establishing relative directions (and hence their respective locality within the FPG). UE 101 initiates requests to base station 104 of a cellular communication network (e.g., base station of 3GPP 4G network (eNB)) for permission to use resources for a SL transmission over the PC5 interface, to which it is assumed that the eNB 104 indicates resource allocations for considered FPD, i.e., announcing UE 101 and monitoring UE 102, UE 301, and UE 302 (which UE 101 already may know of given a preceding FPG establishment over application layer). UE 101 handshakes beamforming capabilities with the other FPDs of the group and, assuming that narrow-beam capabilities are identified, establishes a D2D connection based on refined beams. In this procedure, it can be understood that certain refined beam capabilities are being requested for targeted FPDs; if, for example, one intended FPD does not support (sufficient) beam refinement capabilities, it may be excluded from the initial forming of the FPG. 20

For UE 101 this means that a D2D SL refined beam index is identified for all its FPG connections. Given its current position and given its recent establishment of refined D2D SL beams to its communication peers, UE 101 has derived a beam-to-other-FPD lookup, and hence knows each other FPD's relative locations in the spatial domain. Typically, UE 101 knows that UE 102 is to its left, UE 302 is to its right, and what UEs that are in-between (i.e., UE 301 in this example). After passing tokens on establishing D2D SL connections within the FPG, all FPDs have knowledge of the relative direction to other FPDs.

In a second step, given that UE 101 has a beam index for each other FPD in the group, UE 101 can translate beam directions into a vector or angle representation considering the origin to be its own location. Alternatively, the lookup to vector/angular space may be accomplished by a device preparative to this activity, and only the mapping is executed. It is also assumed that in the vector space, the length of beam vectors further may correspond to used D2D SL transmit power as described in previous steps.

At this stage, UE 101 has two vectors or an angle that defines a "spanning area" for UE 101. In this example the two vectors are a leftmost "border" vector (corresponding to beam index (Bix-1)) that defines one border of a geofenced area 399 and one rightmost "border" vector (corresponding to Bix-2) that defines another border of the geofenced area 399. The same is true for UE 102, UE 301, and UE 302. That is each of these FPDs also has two border vectors that, for the given FPD, defines a spanning area.

Given that each of the FPDs can establish a direction from the FPD to a certain communication device 388 and can translate this direction to a vector representation for the communication device 388, each of the FPDs can use its two border vectors and the vector for the communication device 388 to make an assessment as to whether the communication device 388 appears to be inside the geofenced area 399. For example, if UE 101 determines that the vector for the communication device 388 is within UE 101's spanning area (i.e., between the left border vector and the right border vector) then, in this case, UE 101 determines that the communication device 388 "appears" to be (i.e., could be) inside the geofenced area. In one embodiment, if all of the FPDs determine that the communication device 388 appears to be inside the geofenced area, then it is declared that the communication device 388 is within the geofenced area. In another embodiment, if at least N−1 (where N=4 in this example) of the FPDs determine that the communication device appears to be inside the geofenced area, then it is declared that the communication is within the geofenced area. After communication device 388 is declared to be within the geofenced area, one of the FPD in the FPG may provide to communication device 388 authentication cre-dentials that communicate device can use to gain access to a protected service (i.e., a service that requires its users to be in possession of certain access credentials).

3. Coordinated Handover

As noted previously above, the relative motion among the UEs in the FPG shown in FIG. 3 may be static, but the FPG as whole may move in some direction. As some point, the FPG may approach the boarder of the cell that is currently serving the FPG. Accordingly, the signal strength from the serving cell may decrease while at the same time the signal strength of a neighboring cell increases. When this situation occurs, a legacy procedure for handover may be triggered and this can create a certain challenge.

For instance, if, for example, UE 101 and UE 102 are far enough apart, then it is possible that the handover procedure is first triggered for UE 101, and then, at a later time, it is triggered for UE 102. The result of this is that the sidelink channel may be lost between the time when UE 101 is handed over to the neighbor cell and the time when UE 102 is handed over to the neighbor cell because the SL resources are assigned to the UEs by their respective serving cell. Accordingly, this disclosure in one aspect provides a method for coordinated handover in a system comprising a first UE communicating with a second UE using a sidelink channel.

3.1 A Process for Coordinated Handover

In one embodiment, the process for a coordinated handover begins with a first UE (hereafter UE 101) determining that a handover-situation to a neighbor eNB 304 is emerging. For example, UE 101 has determined certain characteristics of service/neighboring cells RSRP/RSRQ that are indicative of an emerging measurement report (e.g., Event A3) to the serving eNB 104. That is, UE 101 detects a handover event indicating that UE 101 should trigger the source cell to initiate a handover of UE 101 from the source cell to a neighbor cell.

In one embodiment, as a result of detecting the handover event, UE 101 informs the one or more other UEs with which UE 101 has an established SL connection about the emerging handover event. For instance, in the FPG example, UE 101 provides to each other FPD that is a member of the FPG a handover event message indicating that UE 101 has detected a handover event.

In some embodiments, the handover event message includes a measurement report generated by UE 101. For example, in some embodiments the handover event message includes UE 101's signal strength/quality measurements, thereby enabling the other UEs to compare with their own signal strength measurements. In other embodiments, the handover event message includes an Event A3 Measurement Report (see, e.g., 3GPP TS 36.331 and 3GPP TS 38.331) generated by UE 101, which UE 101 either has transmitted to its serving base station 104 or is about to transmit to the serving base station 104. In yet other embodiments, the handover event message includes a configuration message (e.g., an RRC Reconfiguration message) that UE 101 received from the serving base station 104. This configuration message may include information indicative of an handover from serving base station 104 to neighbor base station 304. More specifically, the configuration message may include relevant handover information (timing, identity, etc.) for emerging connection to the neighbor base station 304.

Accordingly, the other FPDs in the FPG may receive (any of or a combination of) the above suggested information from UE 101, e.g., as: 1) indication of an emerging handover in terms of signal strength/quality measurement outcome, or 2) actual triggering message for handover (HO) in terms of the actual Measurement Report Event A3 from UE

101 to its serving eNB 104, and/or 3) the actual RRC Reconfiguration message first FPD received from serving eNB 104 being the result of the Measurement Report Event A3 containing the relevant HO information (timing, identity, etc.) for emerging connection to the neighbor eNB 304.

The other FPDs in FPG may copy and use UE 101's radio conditions as their own to emulate for the eNB 104 that they also simultaneously are approaching same cell border at the same pace etc. as UE 101. Additionally or alternatively, the other FPDs may apply smaller thresholds or TTTs to make hand-over conditions to approach faster (i.e. disobeying HO-related parameters previously received from eNB 104. Similarly, in embodiments in which UE 101 provides to the other FPDs of the FPG content from its RRM Measurement Report Event A3, the other FPDs may copy and use UE 101's RRM Measurement Report Event A3 content in their individual measurement reports to eNB 104.

The result of this is that eNB 104 receives same and simultaneous "RRM Measurement Report Event A3" from all FPDs in FPG (potentially slightly delayed from "others", same measurement period). Accordingly, eNB 104 will also order the other FPDs in FPG to execute same HO procedure as UE 101 (likely very close in time) assigned same neighbor eNB 304.

In one embodiment, when eNB 104 determines, based on a measurement report transmitted by UE 101, that the eNB 104 should HO UE 101 to neighbor eNB 304, eNB 104 transmits to neighbor eNB 304 a handover request (e.g., an X2AP Handover Request). This handover request may include information identifying radio resources that eNB 104 has allocated for SL communications between UE 101 and, for example, UE 102 and UE 302.

In response to receiving the HO request from eNB 104, neighbor eNB 304 may, if it is able, reserve necessary resources and send to eNB 104 a HO request acknowledge message. This may then trigger eNB 304 to send a configuration message (e.g., an RRC Connection Reconfiguration Request) to UE 101, which then causes UE 101 to establish an RRC connection with neighbor eNB 304 and request SL resources from eNB 304.

In the FPG use case, if the amount of time ("time gap") between a) when UE 101 loses its SL connection with the other FPDs due to the HO and b) when the UE 101 is able to re-establish the SL connection with the other FPDs after the HO is small enough (i.e., less than a threshold T), then the same geo-fence group authentication credentials may be reused. That is, it is determined that there is no need for inside-FPG access credential renewal. Also, the same beam directions may be assumed still valid between FPDs; that is, given the very minor time glitch between "old/new geo-fence re-establishment," it is not plausible that individual FPSs could have moved enough to motivate a re-start of refined beam fence-beam directions.

If, however, the time gap is greater than the threshold, then each FPD may activate the beam setup procedure to discover the correct beams and to re-establish the geofenced area 399. Additionally, because individual FPD positions may have been altered and the original beam directions may no longer be valid, it may be determined that any authentication credentials previously given to communication device 388 should be revoked such that, once again, the FPG will need to determine that communication device 388 is still within the geofenced area 399 before providing new authentication credentials to communicate device 388.

As noted above, the handover request may include information identifying radio resources that eNB 104 has allocated for SL communications between UE 101 and UE 102 and UE 302, and neighbor eNB 304 may, if it is able, reserve necessary resources and send to eNB 104 a HO request acknowledge message. However, it is possible that neighbor eNB 304 is not able to allocate the necessary resources to enable SL communications between all the members of the FPG. Accordingly, the entire FPG (or a part of FPG) may not be able to establish SL communication when served by the neighbor eNB 304. In one approach, neighbor eNB 304 may inform source eNB 104 of the not-to-be-complied SL resource allocation for the FPG currently considered for HO. The source eNB 104 may then either cancel handover (Mobility Management—Handover Cancel) for barred UE which may compromise FPG integrity (at least not benefiting from a fast HO), or information may be received from neighbor eNB that resources associated with D2D communication pool is not accessible, still proceed with HO despite D2D SL barring and hope that resource allocation may be solved later on.

As the above description demonstrates, the above described coordinated HO approach is transparent to the source eNB 104 as it is "fooled" to think that all members of the FPG perceive the same radio conditions and report Event A3 simultaneously, thereby causing source eNB 104 to initiate the HO for each member of the FPG at the same time (or substantially the same time). Accordingly, with this approach, the geo-fence-defining FPG will be moved (assuming resource allocation at neighbor eNB is possible) from the eNB 104 to eNB 304 at essentially the same time without requiring any dedicated group signaling/handshake.

FIG. 4 is a flowchart illustrating a process 400, according to an embodiment, for coordinated handover in a system comprising a first UE (UE 101) communicating with a second UE (UE 102) using a sidelink channel, wherein both the first UE and the second UE are being served by a source cell (e.g., a cell served by eNB 104). Process 400 may begin with step s402.

Step s402 comprises the first UE detecting a handover event indicating that the first UE should trigger the source cell to initiate a handover of the first UE from the source cell to a neighbor cell. In one embodiment, the step of the first UE detecting a handover event comprises the first UE determining that the first UE should transmit to the source cell a measurement report.

Step s404 comprises, as a result of the first UE detecting the handover event, the first UE transmitting to the second UE a handover event message indicating that the first UE has detected the handover event. In one embodiment, the handover event message triggers the second UE to trigger the source cell to initiate a handover of the second UE from the source cell to the neighbor cell.

In some embodiments process 400 includes step s406 in which the first UE transmits a measurement report to the source cell (e.g., the first UE transmits the measurement report to the eNB 104 that manages the source cell), wherein the measurement report comprises measurement information (e.g., reference signal received power (RSRP) measurements), and the handover event message transmitted to the second UE comprises the measurement information.

In some embodiments process 400 includes step s408 in which, after transmitting the measurement report, the first UE receives from the source cell (e.g., from eNB 104) a configuration message (e.g., an RRC Connection Reconfiguration Message) comprising configuration information, wherein the handover event message transmitted to the second UE comprises the configuration information.

In some embodiments, the step of the first UE detecting the handover event comprises: the first UE obtaining a first measurement result associated with the source cell and the first UE obtaining a second measurement result associated with the neighbor cell, and the handover event message transmitted to the second UE comprises the first measurement result and the second measurement result.

Figure 5:
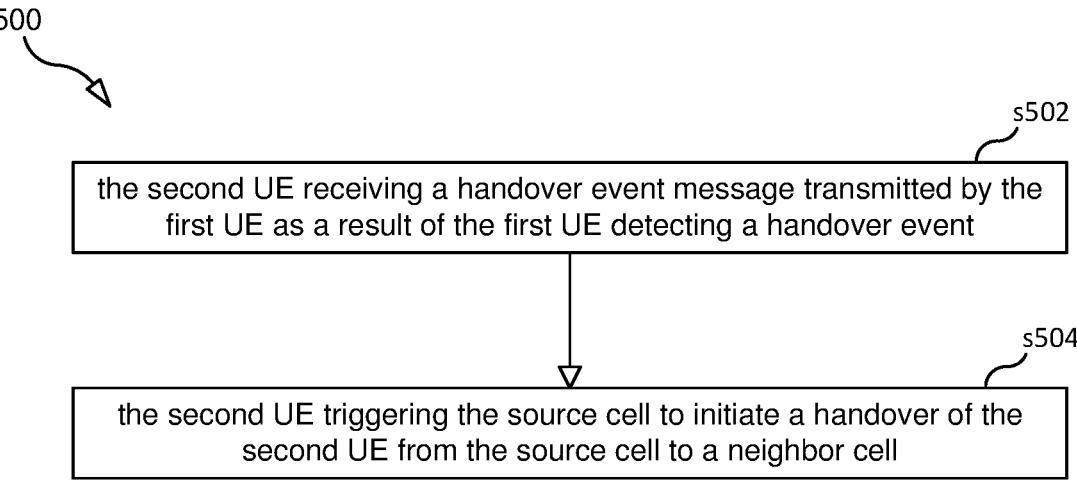
FIG. 5 is a flowchart illustrating a process according to some embodiments.

FIG. 5 is a flowchart illustrating a process 500, according to an embodiment, for coordinated handover in a system comprising a first UE (UE 101) communicating with a second UE (UE 102) using a sidelink channel, wherein both the first UE and the second UE are being served by a source cell (e.g., a cell served by eNB 104). Process 500 may begin with step s502. Step s502 comprises the second UE receiving a handover event message transmitted by the first UE as a result of the first UE detecting a handover event. Step s504 comprises, after receiving the handover event message, the second UE triggering the source cell to initiate a handover of the second UE from the source cell to a neighbor cell. For example, the handover event message triggers the second UE to trigger the source cell to initiate the HO.

In some embodiments, the handover event message comprises measurement information that the first UE transmitted to the source cell in a measurement report. In some embodiments, the handover event message comprises configuration information that was contained in a configuration message that was transmitted by the source cell to the first UE. In some embodiments, the handover event message comprises a first measurement result obtained by the first UE and associated with the source cell and a second measurement result obtained by the first UE and associated with the neighbor cell.

In some embodiments, the first UE is a first fence-pole device (FPD) of a fence-pole group (FPG), and the second UE is a second FPD of the FPG.

Figure 6:
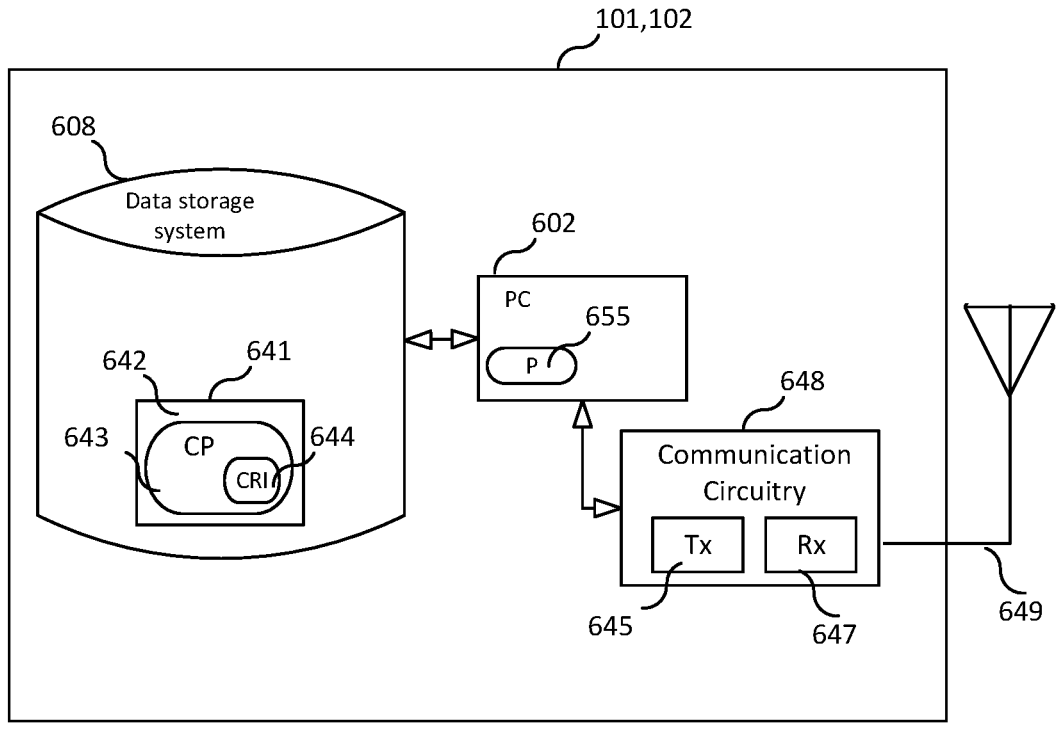
FIG. 6 illustrates a UE according to some embodiments.

FIG. 6 is a block diagram of a UE 600, according to some embodiments, which can be used to implement any one of the UEs described herein (e.g., UE 101 or UE 102). As shown in FIG. 6, UE 600 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like); communication circuitry 648, which is coupled to an antenna arrangement 649 comprising one or more antennas and which comprises a transmitter (Tx) 645 and a receiver (Rx) 647 for enabling UE 600 to transmit data and receive data (e.g., wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes UE 600 to perform steps described herein (e.g., steps described herein with reference to the flow charts). In other embodiments, UE 600 may be configured to perform steps described herein without the need for code. That is, for example, PC 602 may consist merely of one or more ASICs. Hence, the features of the embodiments described herein may be implemented in hardware and/or software.

Figure 7:
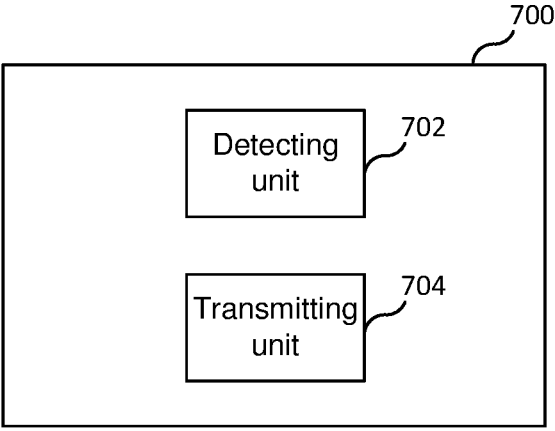
FIG. 7 is a functional block diagram of a user equipment according to some embodiments.

FIG. 7 is a functional block diagram of a UE 700, according to some embodiments, which can be used to implement any one of the UEs described herein (e.g., UE 101 or UE 102). As shown in FIG. 7, UE 700 may comprise a detecting unit 702 and a transmitting unit 704. In one embodiment, detecting unit 702 is configured to detect a handover event indicating that the UE 700 should trigger a source cell to initiate a handover of UE 700 from the source cell to a neighbor cell. The transmitting unit 704 is configured such that, as a result of the detecting unit 702 detecting the handover event, the transmitting unit 704 transmits to another UE a handover event message indicating that UE 700 has detected a handover event.

Conclusion

This disclosure provides a coordinated handover procedure that can be used in, for example, a geo-fencing system. The coordinated handover procedure allows the FPDs of an FPG to be moved from a source eNB to a neighbor eNB in a time-coordinated manner and in a manner that is transparent to the HO-controlling source eNB. This approach reduces the likelihood that SL group-enabled authentication credentials will need to be revoked.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for coordinated handover in a system comprising a first user equipment (UE) communicating with a second UE using a sidelink channel, wherein both the first UE and the second UE are being served by a source cell, the method comprising:

the first UE detecting a handover event indicating that the first UE should trigger the source cell to initiate a handover of the first UE from the source cell to a neighbor cell; and as a result of the first UE detecting the handover event indicating that the first UE should trigger the source cell to initiate the handover of the first UE from the source cell to the neighbor cell, the first UE transmitting to the second UE a handover event message indicating that the first UE has detected the handover event; and the first UE transmitting a measurement report to the source cell, wherein the measurement report comprises measurement information, and the handover event message transmitted to the second UE comprises the measurement information.

2. The method of claim 1, wherein the handover event message triggers the second UE to trigger the source cell to initiate a handover of the second UE from the source cell to the neighbor cell.

3. The method of claim 1, wherein the first UE detecting the handover event comprises the first UE determining that the first UE should transmit to the source cell the measurement report.

4. The method of claim 3, further comprising:

the first UE transmitting the measurement report to the source cell; and after transmitting the measurement report, the first UE receiving from the source cell a configuration message comprising configuration information, wherein the handover event message transmitted to the second UE comprises the configuration information.

5. The method of claim 1, wherein the first UE detecting a handover event comprises: the first UE obtaining a first measurement result associated with the source cell and the first UE obtaining a second measurement result associated with the neighbor cell, and the handover event message transmitted to the second UE comprises the first measurement result and the second measurement result.

6. The method of claim 1, wherein the handover event message comprises configuration information that was contained in a configuration message that was transmitted by the source cell to the first UE.

7. The method of claim 1, wherein the handover event message comprises a first measurement result obtained by the first UE and associated with the source cell and a second measurement result obtained by the first UE and associated with the neighbor cell.

8. The method of claim 1, wherein the first UE is a first fence-pole device (FPD) of a fence-pole group (FPG), and the second UE is a second FPD of the FPG.

9. A method for coordinated handover in a system comprising a first user equipment, UE, communicating with a second UE using a sidelink channel, wherein both the first UE and the second UE are being served by a source cell, the method comprising:

the second UE receiving a handover event message transmitted by the first UE as a result of the first UE detecting a handover event indicating that the first UE should trigger the source cell to initiate a handover of the first UE from the source cell to a neighbor cell; and after receiving the handover event message, the second UE triggering the source cell to initiate a handover of the second UE from the source cell to the neighbor cell, wherein the first UE transmitted a measurement report to the source cell, the measurement report comprises measurement information, and the handover event message transmitted to the second UE comprises the measurement information.

10. A first user equipment (UE), the first UE comprising:

processing circuitry; and a memory, the memory containing instructions executable by the processing circuitry, wherein the first UE is configured to perform a method comprising:

detecting a handover event indicating that the first UE should trigger a source cell to initiate a handover of the first UE from the source cell to a neighbor cell, wherein the source cell serves the first UE and a second UE;

as a result of the first UE detecting the handover event, transmitting to the second UE a handover event message indicating that the first UE has detected the handover event; and transmitting a measurement report to the source cell, wherein the measurement report comprises measurement information, and the handover event message transmitted to the second UE comprises the measurement information.

11. A second user equipment (UE), the second UE comprising:

processing circuitry; and a memory, the memory containing instructions executable by the processing circuitry, wherein the second UE is configured to perform a method comprising:

receiving a handover event message transmitted by a first UE as a result of the first UE detecting a handover event, wherein both the first UE and the second UE are served by a source cell; and after receiving the handover event message, triggering the source cell to initiate a handover of the second UE from the source cell to a neighbor cell, wherein the first UE transmitted a measurement report to the source cell, the measurement report comprises measurement information, and the handover event message transmitted to the second UE comprises the measurement information.

12. A non-transitory computer readable storage medium storing a computer program comprising instructions which when executed by processing circuitry of a user equipment (UE) causes the UE to perform the method of claim 1.

13. A non-transitory computer readable storage medium storing a computer program comprising instructions which when executed by processing circuitry of a user equipment (UE) causes the UE to perform the method of claim 9.

* * * * *